(12) United States Patent
Mei et al.

(10) Patent No.: US 10,261,927 B2
(45) Date of Patent: Apr. 16, 2019

(54) DMA CONTROLLER WITH TRIGGER SEQUENCE GENERATOR

(71) Applicant: NXP USA, INC., Austin, TX (US)

(72) Inventors: Wangsheng Mei, Suzhou (CN); Gang Shi, Suzhou (CN); Kun Wu, Suzhou (CN)

(73) Assignee: NXP USA, INC., Austin, TX (US)

( * ) Notice: Subject to any disclaimer, the term of this patent is extended or adjusted under 35 U.S.C. 154(b) by 77 days.

(21) Appl. No.: 15/677,017

(22) Filed: Aug. 15, 2017

(65) Prior Publication Data
US 2019/0012283 A1 Jan. 10, 2019

(30) Foreign Application Priority Data
Jul. 10, 2017 (CN) .......................... 2017 1 0554148

(51) Int. Cl.
| G06F 13/16 | (2006.01) |
| G06F 13/28 | (2006.01) |
| G06F 13/40 | (2006.01) |
| G06F 13/42 | (2006.01) |

(52) U.S. Cl.
CPC .......... *G06F 13/28* (2013.01); *G06F 13/1605* (2013.01); *G06F 13/4022* (2013.01); *G06F 13/4282* (2013.01)

(58) Field of Classification Search
CPC .. G06F 13/1605; G06F 13/28; G06F 13/4022; G06F 13/4282
See application file for complete search history.

(56) References Cited

U.S. PATENT DOCUMENTS

| 5,212,795 | A | | 5/1993 | Hendry | |
| 5,287,486 | A | | 2/1994 | Yamasaki et al. | |
| 5,457,694 | A | * | 10/1995 | Smith | G06F 11/349 |
| | | | | | 710/100 |
| 6,691,182 | B2 | | 2/2004 | Kagemoto | |
| 7,577,773 | B1 | | 8/2009 | Gandhi et al. | |
| 9,971,524 | B1 | * | 5/2018 | Bruce | G06F 3/0617 |
| 2005/0216613 | A1 | * | 9/2005 | Ganapathy | G06F 13/28 |
| | | | | | 710/22 |
| 2007/0162652 | A1 | * | 7/2007 | Go | G06F 13/28 |
| | | | | | 710/22 |

* cited by examiner

*Primary Examiner* — Eric T Oberly
(74) *Attorney, Agent, or Firm* — Charles E. Bergere

(57) ABSTRACT

A DMA controller includes a built-in timing sequence generator that allows the DMA controller to trigger data movement periodically and/or non-equidistantly, without waking a CPU or other peripherals.

6 Claims, 4 Drawing Sheets

DMA CONTROLLER WITH TRIGGER SEQUENCE GENERATOR

BACKGROUND

The present invention is directed to Direct Memory Access (DMA) controllers, and, more particularly, to a DMA controller with a trigger sequence generator.

Direct Memory Access is a technique for allowing data to be transferred to a memory, such as from a peripheral device, without intervention by a processor, which frees the processor to perform other tasks, in parallel. The data transfer task is managed by a DMA controller instead of the processor. FIG. 1 illustrates a conventional DMA controller 10 that is used on various integrated circuit chips, such as microcontroller units (MCU) and Digital Signal Processors (DSP). The DMA controller 10 is located between a first, high speed bus 12, such as AHB (Advanced High-performance Bus) or AXI (Advanced eXtensible Interface), and a lower speed slave bus 14. It is understood that the AHB and AXI bus masters are different in many aspects, but DMA controllers are available for both such systems. The speed bus 12 is used to move data to and from a memory (not shown). A processor such as a central processing unit (CPU) is connected to the DMA controller 10 via the low speed bus 14, and provides information to the DMA controller 10 to configure the DMA controller 10. That is, the CPU instructs the DMA controller 10 with how much data to move, where to get the data (source address) and where to move the data (destination address).

The DMA controller 10 includes a data path 16, an address path 18, control and arbitration logic 20, and DMA program model and data transfer descriptor logic 22. The data path 16 represents the path of the data to be transferred from a source address to a destination address, while the address path 18 is the path for the source and destination addresses. The control and arbitration logic 20 schedules the data exchange to the high-speed bus 12 and manages the data transfer by, for example, putting the source/destination addresses on the high-speed bus 12, and decrementing a counter (e.g., from 7 to 0 if moving 8 words) to control the loop. The DMA controller 10 executes operations by loading transfer configurations (e.g., descriptors) that describe all the details regarding the source/destination, burst size, length of the transfer, etc. The program model and data transfer descriptor logic 22 receives this descriptor information from the low-speed bus 14 to manage the transfer.

Upon the arrival of an external trigger, such as either a software trigger from the CPU or a hardware trigger initialized by an on-chip peripheral like a timer, and received by the DMA program model and data transfer descriptor logic 22, the DMA controller 10 will start to fetch data from a specified source address and move the fetched data to a specified destination address, until the specified amount of data has been transferred. As noted above, during this period, the processor (CPU) does not need to intervene during the data movement and therefore is liberated for other tasks or it may sleep.

In some cases, data movement is done periodically, with the interval between data transfers being either equidistant or non-equidistant. Initiating such periodic data movement can be done using a software trigger issued by the CPU or a hardware trigger from another on-chip peripheral, like a timer. If a software trigger from the CPU is used, the CPU must be kept awake so that it can trigger the DMA transfer requests. This is not efficient in some applications like metering or medical devices where power consumption is a critical design target. On the other hand, if an on-chip timer is used, software is needed to refresh the timing modulus of the timer for those cases where the interval between the DMA transfers is not evenly distributed, which also requires CPU intervention. Furthermore, for some chips there is only one timer resource available and it may be needed for other applications.

Accordingly, it would be advantageous to have a method of triggering DMA activities while allowing the CPU to sleep and at the same time not tying up other chip resources.

BRIEF DESCRIPTION OF THE DRAWINGS

Embodiments of the present invention(s) are illustrated herein by way of example and are not limited by the accompanying figures, in which like references indicate similar elements. Elements in the figures are illustrated for simplicity and clarity and have not necessarily been drawn to scale. Various aspects, features, and benefits of the disclosed embodiments will become more fully apparent, by way of example, from the following detailed description that refers to the accompanying figures, in which.

DETAILED DESCRIPTION

Figure 1:
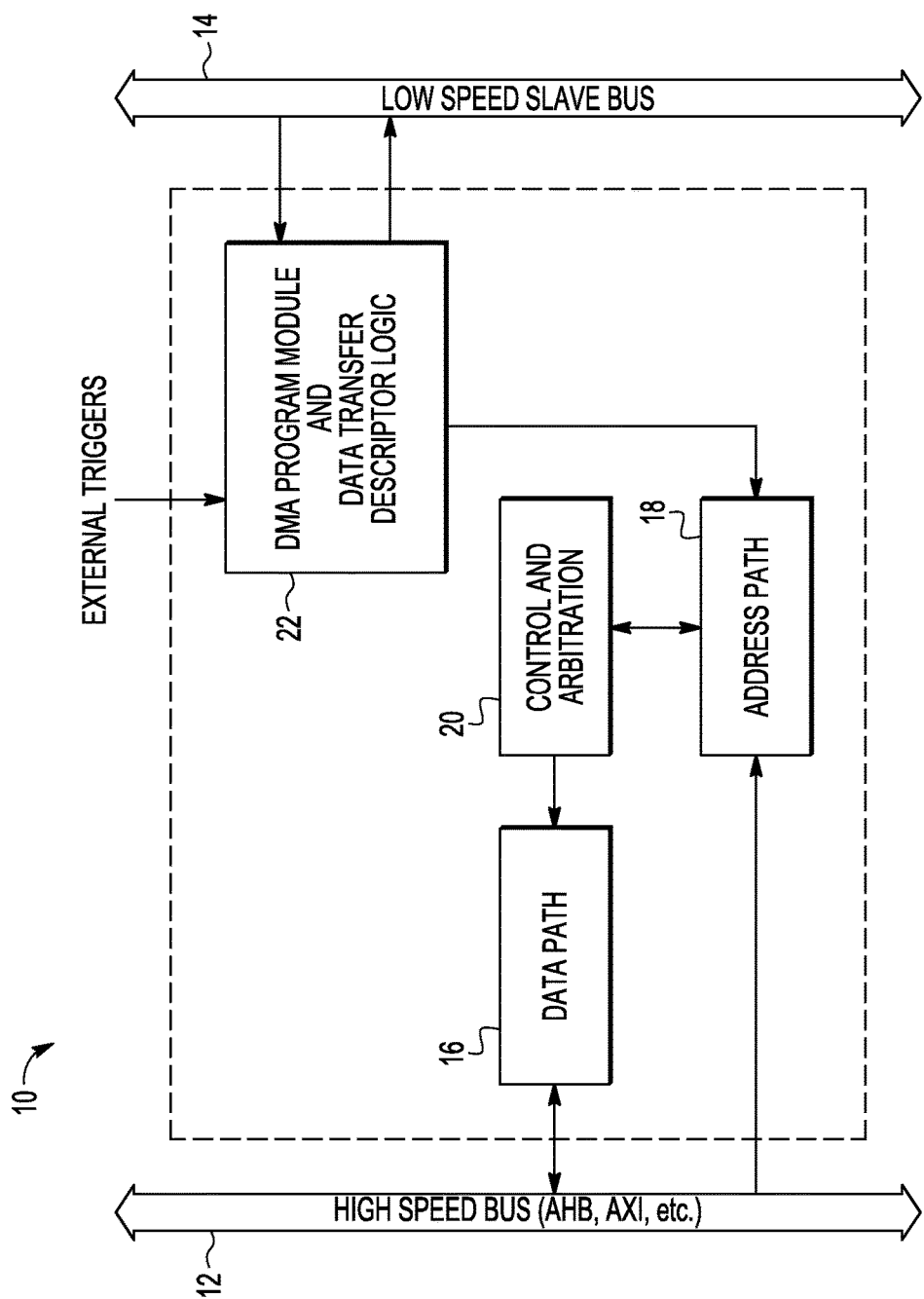
FIG. 1 is a schematic block diagram of a conventional DMA controller.

Detailed illustrative embodiments of the present invention are disclosed herein. However, specific structural and functional details to which the disclosure refers are merely representative for purposes of describing example embodiments of the present invention. Embodiments of the present invention may be embodied in many alternative forms and should not be construed as limited to only the embodiments set forth herein.

As used herein, the singular forms "a," "an," and "the," are intended to include the plural forms as well, unless the context clearly indicates otherwise. It further will be understood that the terms "comprises," "comprising," "has," "having," "includes," and/or "including" specify the presence of stated features, steps, or components, but do not preclude the presence or addition of one or more other features, steps, or components. It also should be noted that, in some alternative embodiments, certain functions or acts may occur out of the order indicated in the figures.

In one embodiment, the present invention is a DMA controller connected to a central processing unit by way of a low speed bus and to a memory by way of a high speed bus. The DMA controller transfers data from a source data address to a destination address. The DMA controller includes a data path, an address path, a control and arbitration unit, a DMA program module, and a built-in trigger sequence generator. The data path is connected to the high speed bus for transferring data to the memory by way of the high speed bus. The address path is connected to the high speed bus for indicating a memory address at which the data transferred to the high speed bus is to be stored. The control and arbitration unit is connected to the address path and the data path, and controls data movement operations of the DMA controller. The DMA program module is connected to the low speed bus and initiates data movement between the high-speed and low-speed busses by way of the data path. The trigger sequence generator is connected to the control and arbitration unit and the DMA program module, and outputs an internal trigger to the DMA program module that causes the DMA program module to initiate a data movement operation. The trigger sequence generator includes a timer modulus buffer that stores a plurality of timer moduli, wherein each timer modulus indicates a time required for a corresponding data movement operation.

In another embodiment, the present invention is a trigger sequence generator that is integral with a DMA controller. The trigger sequence generator includes a timer modulus buffer, a timer, and a mux. The timer modulus buffer stores a plurality of timer moduli. The timer is connected to the modulus buffer and receives a current timer modulus therefrom that indicates an interval of a current data movement operation. The timer generates a count value and an internal timer trigger signal when the count value equals a predetermined value. The mux is connected to the timer and receives the internal timer trigger signal. The mux outputs one of the internal timer trigger signal and an external trigger signal based on a select signal. The internal timer trigger signal indicates completion of the current data movement operation.

Figure 2:
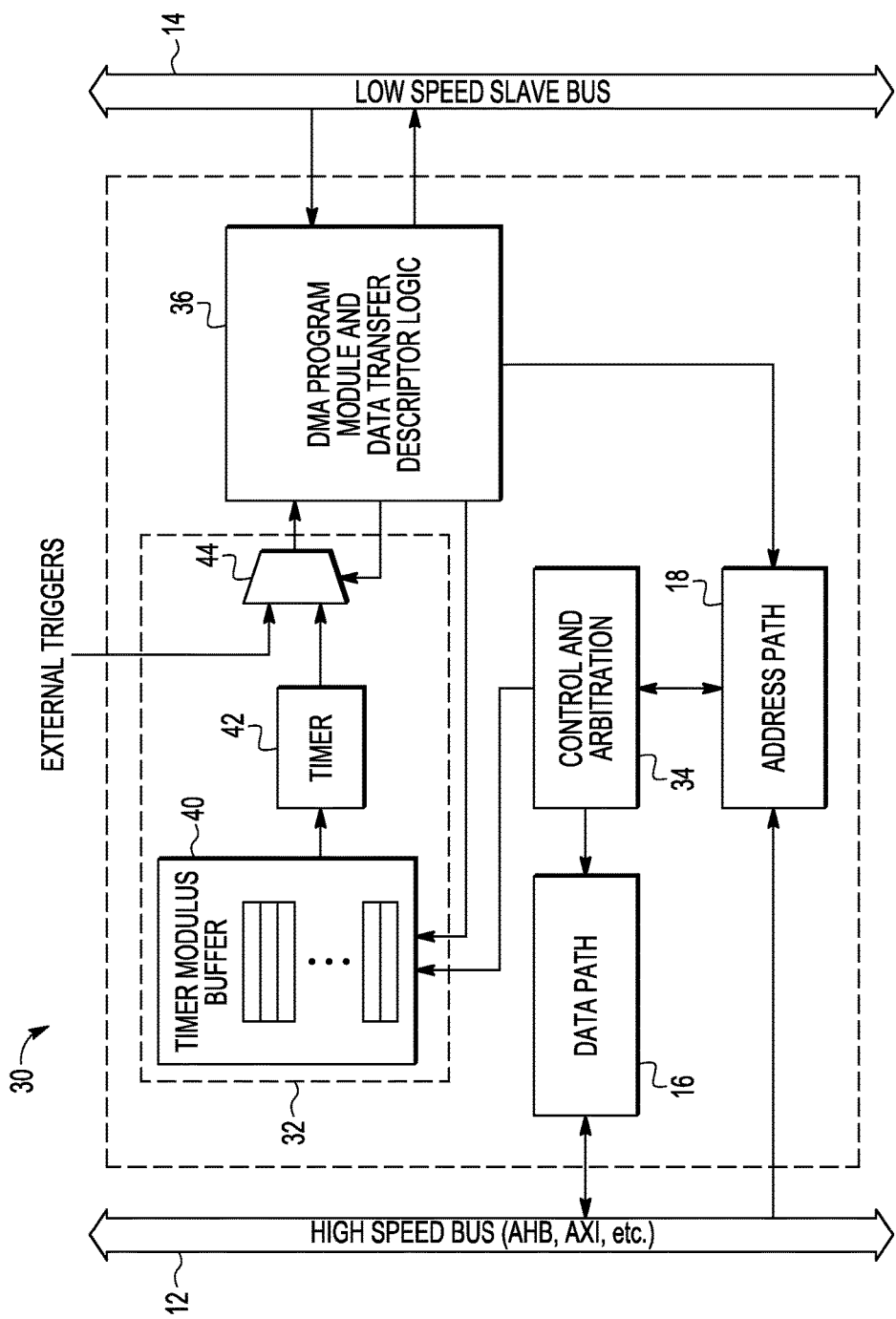
FIG. 2 is a schematic block diagram of a DMA controller in accordance with an embodiment of the present invention.

Referring now to FIG. 2, a schematic block diagram of a DMA controller 30 with a built-in trigger sequence generator 32 in accordance with an embodiment of the present invention is shown. The DMA controller 30, like the DMA controller 10 (FIG. 1), is located between the high-speed bus 12 and the lower speed bus 14, and includes the data and address paths 16 and 18, control and arbitration logic 34, and DMA program model and data transfer descriptor logic 36. The DMA program model and data transfer descriptor logic 36 is similar to the DMA program model and data transfer descriptor logic 22 except that it receives a trigger signal from the trigger sequence generator 32 instead of directly from an external source, and it provides data such as a buffer address, modulus value, and index to the trigger sequence generator 32. The DMA program model and data transfer descriptor logic 36 also provides a select signal to the trigger sequence generator 32 to specify and select a source of the trigger, as either from the trigger sequence generator 32 or an external trigger. The control and arbitration logic 34 is similar to the control and arbitration logic 20 except that it is connected to the trigger sequence generator 32 and provides the status of a transfer to the trigger sequence generator 32 such that, as will be discussed below, a timer modulus is refreshed upon completion of a last data movement.

The built-in trigger sequence generator 32 is a timer based sub-block, and includes a timer modulus buffer 40, a timer 42, and a mux 44 (i.e., multiplexer 44). The timing modulus buffer 40 stores a plurality of timing moduli that are received from the DMA program model and data transfer descriptor logic 36. The timing moduli are refreshed upon completion of a data movement process, which means that the interval between each data movement can be configured without waking up the CPU for issuing a software trigger nor using different hardware triggers from other peripherals. Although as discussed below, an external trigger may be received by the trigger sequence generator 32. For example, if the trigger sequence generator 32 can perform eight (8) transactions without assistance of the CPU, then the buffer 40 is sized to hold eight (8) timing moduli. In one embodiment, the buffer 40 comprises 16 registers, or is sized to hold 16 timing intervals.

The timing modulus buffer 40 is connected to the timer 42. The timer 42 can be either a count-down or count-up timer. After a first DMA transfer is completed, the timer 42 will start to count-up (in the case of a count-up timer) until it reaches the value of one of the moduli stored in the buffer 40. An index to the timer modulus buffer 40 is received from the DMA program module logic 36 to indicate the modulus to be used by the timer 42. Once the timer 42 has reached the modulus value, then the input to the mux 44 from the timer 42 is activated, which triggers a next DMA action. That is, the value input to the mux 44 indicates that the current transaction is done so a next transaction can be initiated. At the same time, the timer 42 stops counting and is cleared or reset. The mux select signal comes from the DMA program module logic 36, and is part of the program data received from the CPU when the transaction is set up. The timer 42 is cleared based on the status of the transfer as received from the control and arbitration logic 34. The timer 42 will resume counting up (from zero) until its count reaches the value of the modulus read from the next location in the timer modulus buffer 40, at which point the trigger signal (from the timer to the mux 44 and from the mux to the DMA program module logic 36) again is activated.

The conventional method of obtaining an active trigger signal is to receive an external trigger signal from an external device or a software trigger from the CPU indicating that a data transfer should be initiated. However, as described above, the present invention provides internal trigger sources for the DMA controller 30 that are independent of external triggers. On the other hand, the trigger sequence generator 32 can receive an external trigger signal the same as in the prior art, in which case the select signal to the mux 40 is set to a value such that the external trigger is selected. Put another way, the present invention provides additional trigger sequences, in addition to the prior art external triggers, which are generated by the trigger sequence generator 32.

Figure 3:
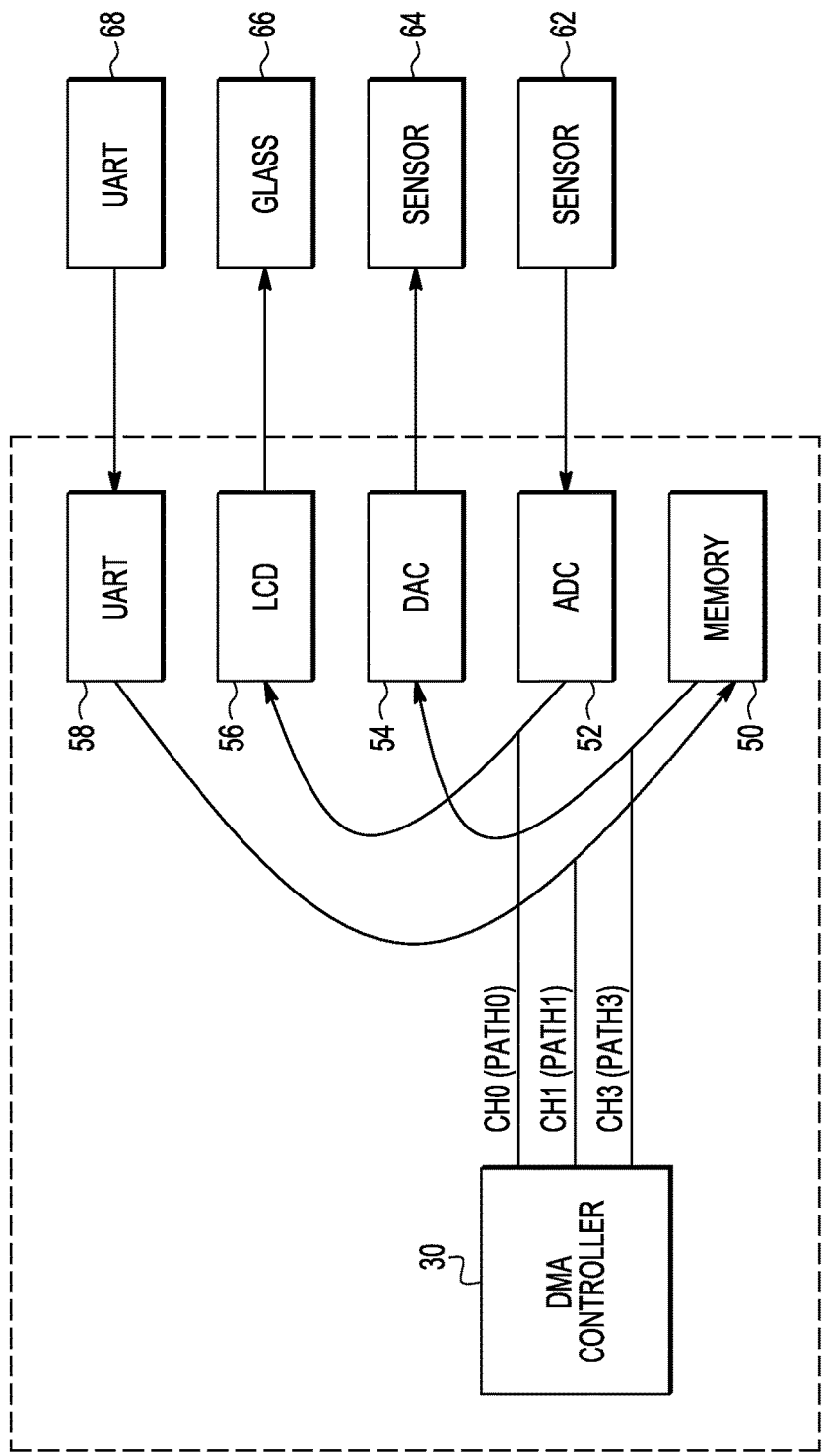
FIG. 3 is a schematic diagram illustrating an example flow of data using a DMA controller in accordance with an embodiment of the present invention connected with various peripheral devices.

FIG. 3 is a schematic diagram illustrating how data can be moved between a memory 50 and different peripheral devices 52-58 using the DMA controller 30 of FIG. 2. The peripheral devices include an analog to digital converter (ADC) 52, a digital to analog converter (DAC) 54, LCD 56 and UART 58, where each of these devices 52-58 comprises a related hardware element, such as sensors 62-64, glass 66 and UART 68. In FIG. 3, the DMA 60 is responsible for moving data between different spaces (memory, peripherals, etc.) for three channels (ch0-ch2). For example, data is moved from the ADC 52 to the LCD 56 on path0; from the UART 58 to the memory 50 on path1; and from the memory 50 to the DAC 54 on path 2. In one example, the data on path0 occurs every 50 ms, path1 every 100 ms and path2 every 20 ms. To achieve this data movement, with the conventional DMA controller 10 (FIG. 1), there are three main solutions. The first one is to let the CPU run all the time and explicitly configure the DMA transfer time to time per the application requirement. Obviously, the disadvantage of this method is that the CPU consumes power all the time especially when the CPU isn't needed for any other tasks. The second option is to wake-up the CPU periodically and configure the different channels of the DMA per the requirement, for example, every 50 ms to start a transfer request on channel 0, etc. This way also requires a timer to wake-up the CPU. Another disadvantage is that CPU will consume power each time it configures the DMA. The third option is to have three independent timers on-chip, where each timer is responsible for the generation of the hardware trigger for a particular DMA channel. The disadvantage here is the requirement of having several independent timers running all the time. However, with the DMA controller 30 of the present invention, only the one timer 42 located inside the DMA controller 30 is needed and the CPU can sleep as soon as it finishes setting up the peripherals 50-58. The DMA controller 30 starts the first data movement upon receipt of a request, and after the first data movement, the DMA controller 30 itself goes to an idle state. The first request can be from a software trigger set up by the CPU, or a hardware trigger from one of the peripheral devices 52-58. The built-in timer 42 starts to count-up (or down) using a specified timing modulus stored in the timer modulus buffer 40. When the counter value reaches the modulus value, the timer 42 generates a trigger, which is provided to the DMA program module 36 by way of the mux 44 to request another transfer. Since the modulus is refreshed after a transfer is completed (that is, a buffer pointer points to the next buffer address), the interval between transfers is independent and configurable.

Figure 4:
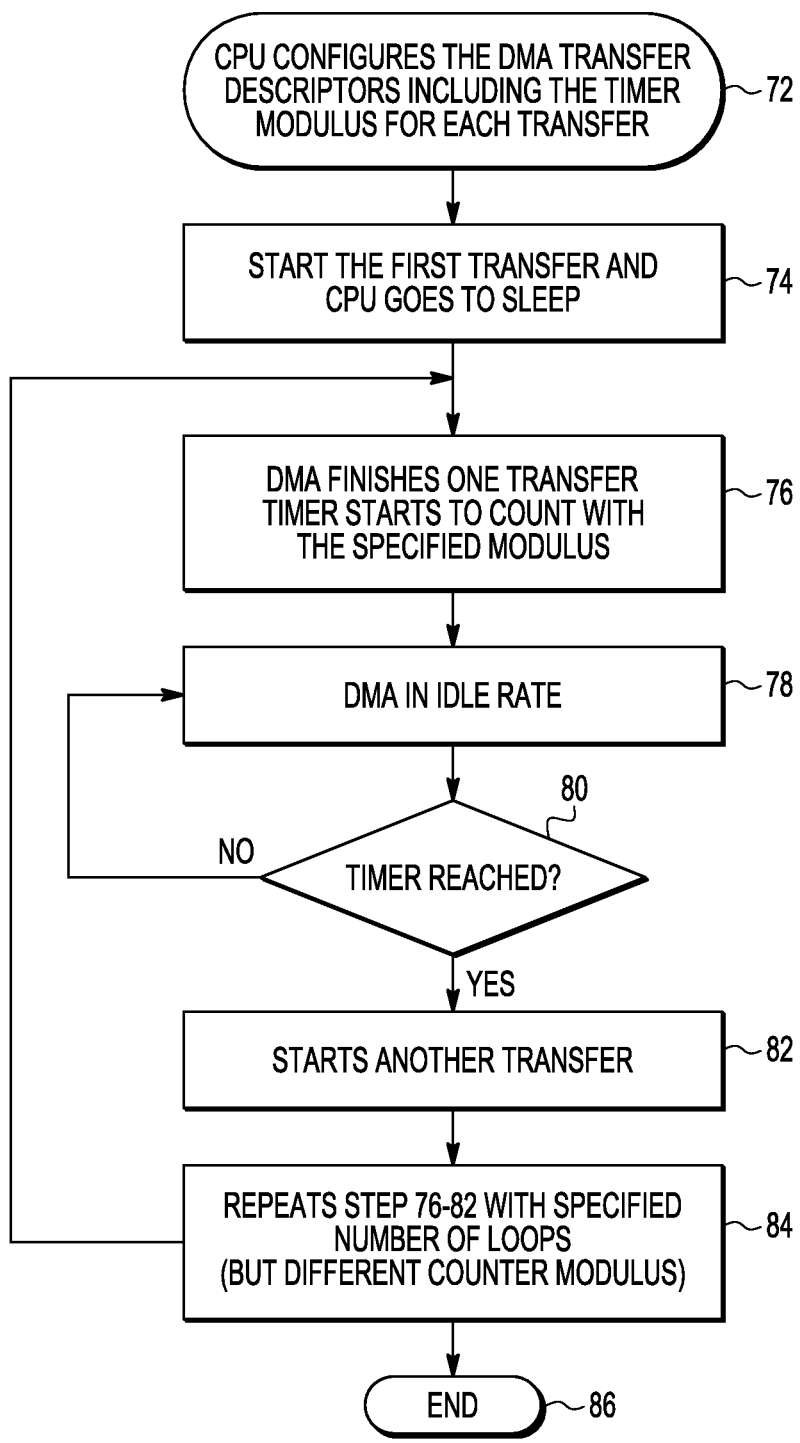
FIG. 4 is a flow chart of a method of triggering a DMA in accordance with an embodiment of the present invention.

FIG. 4 is a flow chart 70 of a method of operating a DMA controller in accordance with an embodiment of the present invention. In a first step at 72, a central processor (CPU) configures the DMA transfer descriptors, including the timer modulus for each transfer. Referring to FIG. 2, the CPU sends the DMA transfer descriptors and the timer modulus to the DMA controller 30 via the low speed slave bus 14, with the DMA transfer descriptors going to the DMA program module 36 and the timing modulus being passed on to the timer modulus buffer 40 of the trigger sequence generator 32 from the DMA program module 36.

At step 74, the DMA controller 30 starts the first transfer and the CPU can go to sleep assuming it has no other tasks to perform. Step 76 shows the DMA controller 30 finishing the first transfer, and the timer 42 begins counting using a specified modulus stored in the modulus buffer 40. At this point, the DMA controller 30 is in an idle state, as shown at step 78. At step 80, if the timer 42 has not completed its count, then the DMA controller 30 loops back to step 78. Thus, steps 78 and 80 are performed until the timer 42 finishes counting.

At step 80, when the timer 42 finishes counting, for example by either counting down to zero or counting up to the specified timer modulus, the DMA controller 30 starts another transfer operation, as indicated at step 82. Step 84 indicates that the DMA controller 30 will repeat steps 76-82, using a specified timer modulus stored in the buffer 40 for each transfer.

Thus, as will be apparent to those of skill in the art, the present invention provides a DMA controller with a built-in timing sequence generator including a buffer for holding one or more timer moduli, which allows the DMA controller to manage a plurality of DMA transfers that may have different timing requirements, while the CPU sleeps.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

Although the steps in the following method claims are recited in a particular sequence with corresponding labelling, unless the claim recitations otherwise imply a particular sequence for implementing some or all of those steps, those steps are not necessarily intended to be limited to being implemented in that particular sequence.

The invention claimed is:

1. A Direct Memory Access (DMA) controller connected to a central processing unit by way of a low speed bus and to a memory by way of a high speed bus, wherein the DMA controller transfers data from a source data address to a destination address, the DMA controller comprising:
a data path connected to the high speed bus for transferring data to the memory by way of the high speed bus;
an address path connected to the high speed bus for indicating a memory address at which the data transferred to the high speed bus is to be stored;
a control and arbitration unit connected to the address path and the data path, wherein the control and arbitration unit controls data movement operations of the DMA controller;
a DMA program module connected to the low speed bus that initiates data movement between the high-speed and low-speed busses by way of the data path; and
a built-in trigger sequence generator connected to the control and arbitration unit and the DMA program module, wherein the trigger sequence generator outputs an internal trigger to the DMA program module that causes the DMA program module to initiate a data movement operation, wherein the trigger sequence generator comprises:
a timer modulus buffer connected to the control and arbitration unit for storing a plurality of timer moduli, and to the DMA program module for receiving an index to a current timing modulus of the plurality of timer moduli stored in the buffer, wherein the current timer modulus indicates an interval of a current data movement operation;
a timer connected to the buffer for receiving the current timer modulus and generating an internal trigger signal that indicates completion of the current data movement operation; and
a multiplexer connected to the timer for receiving the internal trigger signal, wherein the multiplexer outputs one of the internal trigger signal and an external trigger signal, based on a trigger signal select signal, to the DMA program module.

2. The DMA controller of claim 1, wherein each timer modulus indicates a time required for a corresponding data movement operation.

3. The DMA controller of claim 1, wherein the timer modulus buffer comprises at least one of a register file and a look up table.

4. The trigger sequence generator of claim 1, wherein the timer counts down from a value of the current timer modulus, and the predetermined value equals zero.

5. The trigger sequence generator of claim 1, wherein the timer counts up from zero, and the predetermined value equals the current timer modulus.

6. The trigger sequence generator of claim 1, wherein the select signal is received from the DMA program module.

\* \* \* \* \*